United States Patent [19]
Blum et al.

[11] Patent Number: 6,165,343
[45] Date of Patent: *Dec. 26, 2000

[54] PROCESS FOR GENERATING BROMINE COMPOUND

[75] Inventors: David B. Blum, Wayne, N.J.; Rodney H. Sergent, West Lafayette, Ind.; Vadim Zolotarsky, Springfield, N.J.

[73] Assignee: Elcat, Inc., Warren, N.J.

[*] Notice: This patent is subject to a terminal disclaimer.

[21] Appl. No.: 09/246,329

[22] Filed: Feb. 9, 1999

Related U.S. Application Data

[63] Continuation of application No. 08/873,814, Jun. 12, 1997, Pat. No. 5,868,911, which is a continuation of application No. 08/727,133, Oct. 8, 1996, Pat. No. 5,679,239, which is a continuation of application No. 08/413,195, Mar. 27, 1995, abandoned.

[51] Int. Cl.$^7$ .................................. C25B 1/24; C25C 1/24
[52] U.S. Cl. ............................................. 205/556; 205/619
[58] Field of Search ....................................... 205/556, 619

[56] References Cited

U.S. PATENT DOCUMENTS

| | | | |
|---|---|---|---|
| 5,385,650 | 1/1995 | Howarth et al. | 205/556 X |
| 5,429,723 | 7/1995 | Atkinson | 250/556 |
| 5,679,239 | 10/1997 | Blum et al. | 205/556 |

*Primary Examiner*—Donald R. Valentine
*Attorney, Agent, or Firm*—Wolf, Greenfield & Sacks, P.C.

[57] ABSTRACT

The present invention provides a process for generating an aqueous solution containing at least one active bromine compound comprising the steps of: electrolyzing an aqueous solution containing bromide ions until bromate ions are formed in said aqueous solution; and introducing to the aqueous solution containing bromate ions an acid to generate an aqueous solution containing at least one active bromine compound. The present invention also provides an apparatus for generating an aqueous solution containing at least one active bromine compound. The aqueous solution containing the active bromine compound(s) generated using the process and apparatus of the present invention may be used for water treatment and the recovery of precious metals such as gold.

9 Claims, 1 Drawing Sheet

PROCESS FOR GENERATING BROMINE COMPOUND

This is a continuation of application Ser. No. 08/873,814, filed Jun. 12, 1997, now U.S. Pat. No. 5,868,911, which is a continuation of application Ser. No. 727,133, filed Oct. 8, 1996, now U.S. Pat. No. 5,679,239, which is a continuation of U.S. application Ser. No. 413,195, filed Mar. 27, 1995, now abandoned.

BACKGROUND OF THE INVENTION

This invention relates to an improved process for generating an aqueous solution containing at least one active bromine compound which may be used for water treatment and the recovery of precious metals such as gold.

The electrogeneration of bromine is well known. The typical process for electrogenerating bromine is described in European Patent Application Publication No. 476,862, published Mar. 25, 1992, filed in the name of Great Lakes Chemical Corporation. In that process, an aqueous solution containing sodium bromide is electrolyzed at a controlled acidic pH to produce the desired bromine solution. The oxidation of the bromide ion to bromine at acidic pH yields 1.0 g bromine equivalent per 1.0 g bromide. Volatile hydrogen is also formed which must be ventilated by some means. This process for generating bromine is inadequate, however, since the yield of bromine per starting bromide material is low due to the chemistry of the reaction, and some of the bromine is invariably lost during ventilation of the volatile hydrogen gas.

Equivalent bromine in the form of hypobromous acid also has been formed by electrolyzing a solution containing a combination of chloride and bromide ion, as described in European Patent No. 391,924, issued Mar. 25, 1992, to Cogent Limited ("the Cogent Limited EP Patent"). In that process, the optimal yield of hypobromous acid is generated by starting with an initial molar ratio of chloride:bromide of 4:1, and controlling the rate and period of electrolysis. This process is not adequate for generating bromine, however, because bromate, which has no biofouling control capabilities, is invariably formed. The Cogent EP Patent suggests that the formation of unwanted bromate may be minimized by reducing the period of electrolysis.

Aqueous bromine also may be formed from an aqueous mixture of bromide-bromate salts without electrolysis by acid addition as described in U.S. Pat. No. 3,222,276, issued Dec. 7, 1965 to L. E. Belohlav and J. R. Underhill, Lafayette ("the Belohlav U.S. Patent"). Such a process for producing bromine on-site, however, is also not adequate because it is not economical and requires the transportation of hazardous (oxidizer) bromate.

The present invention provides an improved process for generating bromine which (1) substantially eliminates the formation of bromine gas at controlled acidic pH thus minimizing excess bromide consumption and reducing raw material costs; (2) substantially eliminates unwanted bromate contamination in the final bromine solution; and (3) does not require the transportation of hazardous (oxidizer) bromate.

SUMMARY OF THE INVENTION

The present invention provides a process for generating an aqueous solution containing at least one active bromine compound comprising the steps of: electrolyzing an aqueous solution containing bromide ions until bromate ions are formed in said aqueous solution; and introducing to the aqueous solution containing bromate ions an acid to generate an aqueous solution containing at least one active bromine compound.

The present invention also provides an apparatus for generating an aqueous solution containing at least one active bromine compound. That apparatus comprises:

(a) an electrogeneration system for electrolyzing an aqueous electrolyte solution comprising (i) at least one electrochemical cell comprising at least one anode, at least one cathode, and an electric current means for applying electric current to said electrochemical cell; (ii) an electrolyte reservoir for holding an aqueous electrolyte solution containing bromide ions, or a mixture of bromide and chloride ions; and (iii) a transport means for transporting said aqueous electrolyte solution between said electrochemical cell and said electrolyte reservoir;

(b) an acid reservoir for holding an acid;

(c) an acid introduction means for introducing said acid from said acid reservoir to said aqueous electrolyte solution; and (d) a control means for controlling: (i) said transport means to transport a selected volume of said electrolyte solution between said electrolyte reservoir and said electrochemical cell at an electric current sufficient to generate bromate ions in said aqueous electrolyte solution; and (ii) said acid introduction means to introduce said acid to said aqueous electrolyte solution containing bromate ions to generate an aqueous solution containing at least one active bromine compound.

The aqueous solution containing the active bromine compound(s) generated by the process and apparatus of the present invention may be used for the on-site treatment of water such as wastewater, sewage, pools and hot tubs, or in the recovery of precious metals such as gold. Other uses would be apparent to those skilled in the art.

DETAILED DESCRIPTION OF THE INVENTION

Figure 1:
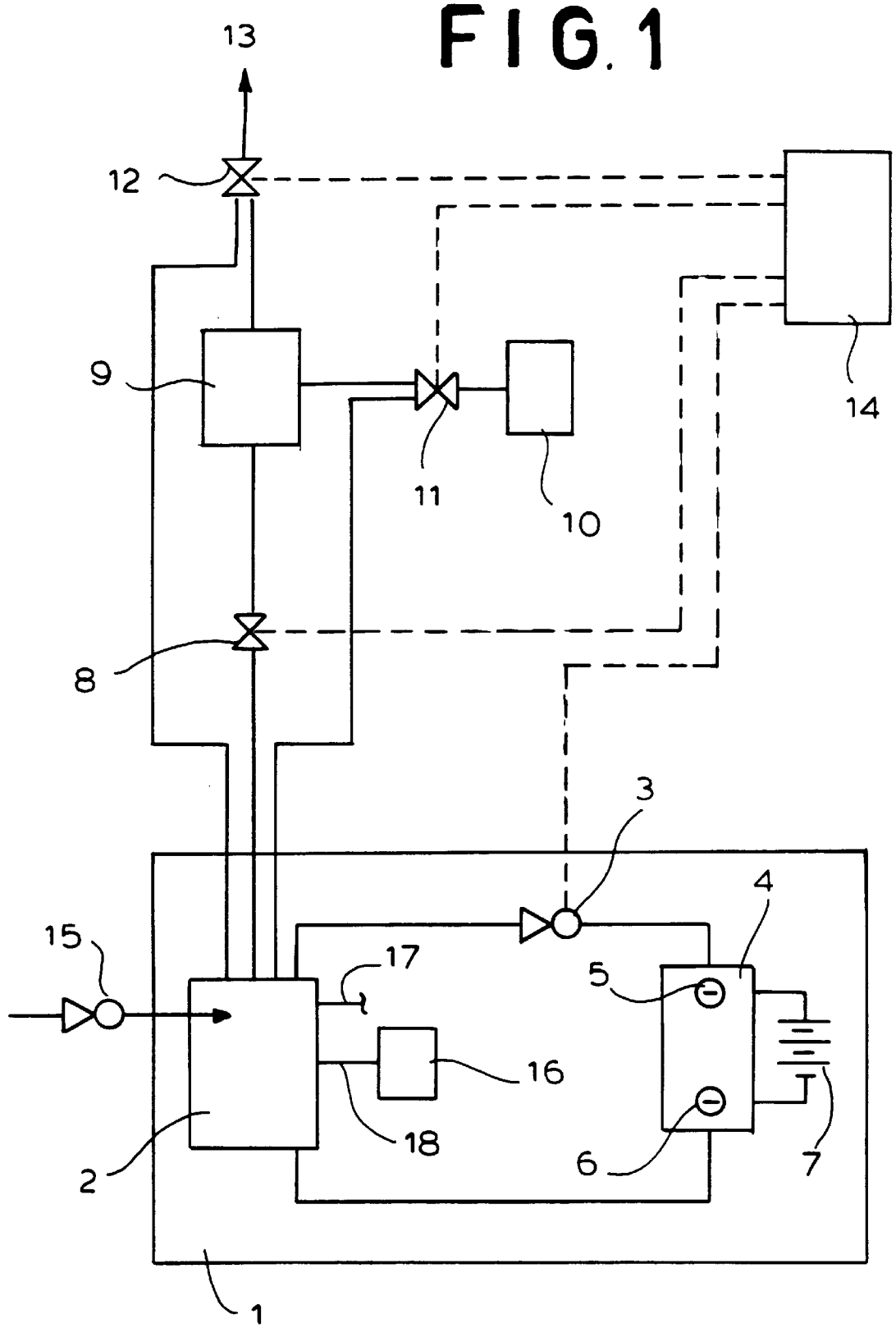
FIG. 1 represents a diagram of the apparatus which may be used for carrying out the process of the present invention.

In the process of the present invention, an aqueous solution containing the active bromine compound(s) is generated by first electrolyzing an aqueous solution containing bromide ions until bromate ions are formed in said aqueous solution. Acid is then introduced to the aqueous solution containing bromate ions to generate an aqueous solution containing the active bromine compound(s).

The starting halide ion solution is prepared by mixing a commercially available source of bromide ions such as sodium bromide with water so that the final percentage of bromide ions in the water is about 0.25 to 45% by weight, and preferably about 0.25 to 15% by weight. The halide ion solution also may preferably contain chloride ions. It is known that the addition of chloride ions will increase both the electrochemical (Faraday) efficiency of the process, and the electrolyte conductivity, and as a result, reduce the energy requirements. Sodium chloride is the preferred source of the chloride ion since it is the least expensive source of the chloride ion. However, other alkali metal chlorides may be used, such as potassium chloride, for example. When the halide ion solution contains both bromide and chloride ions, the final percentage of the halide ions in the water is again about 0.25 to 45% by weight, and preferably about 0.25 to 15% by weight. The relative ratios of chloride to bromide ions is not critical to the invention.

The pH of the starting halide solution is generally near neutral since the commercially available sodium bromide and/or sodium chloride are typically near neutral. However, the starting pH is not critical to the invention, and should be generally above a pH of 2. However, lower values of pH will also work. However, this results in lower values of Faraday efficiency. During electrolysis, the pH generally rises to a self-limiting value of pH 8–12. It is within the confines of the present invention that the pH may be adjusted during the electrolysis to render it more or less alkaline. For purposes of simplicity and ease, however, it is generally preferred to allow the pH to naturally rise during electrolysis without controlling the pH.

The starting temperature is nominally ambient, and is generally a function of the starting concentrate and process water temperatures. As the electrolysis proceeds, the solution temperature rises due to resistance heating (conversion of electrical energy to thermal energy) of the electrolyte. The rate of rise and the final temperature are a function of the DC current, the solution conductivity, the cell geometry, and the local ambient conditions. Typical final temperatures may range between about 20–60° C.

The electrolysis of the aqueous bromide ion solution permits the formation of bromate ions as follows. The bromide ions are electrochemically oxidized at the anode to form bromine which hydrolyzes in an aqueous solution to form hypobromous acid and/or hypobromite ion. The relative amount of each constituent is essentially determined by the pH. Subsequently, three moles of hypobromite ion chemically react to produce one mole of bromate ion, releasing two moles of bromide ions. The overall reaction process favors the continued formation of bromate ions because the bromide ions released during the bromate ion forming reaction are again available to be electrochemically oxidized to produce more bromine, which in turn hydrolyzes to hypobromous acid and/or hypobromite ion, which in turn reacts to form more bromate ions, again releasing more bromide ions, and so on. The final electrolyzed aqueous solution contains bromate ions, and may contain hypobromous acid, and hypobromite and bromide ions. The relative amounts of each will depend upon the reaction conditions and time.

When the starting halide solution contains both bromide and chloride ions, the reaction proceeds as described above. The bromide and chloride ions are both oxidized to form hypobromous acid and/or hypobromite ion and hypochlorous acid and/or hypochlorite ion, respectively. Subsequently, three moles of hypobromite ion chemically react to produce one mole of bromate ion, releasing two moles of bromide ions. Three moles of hypochlorite ion may also chemically react to produce one mole of chlorate ion, releasing two moles of chloride ions. The overall reaction process favors the continued formation of bromate and chlorate ions because the bromide and chloride ions released during the respective bromate and chlorate ion forming reactions are again available to be electrochemically oxidized to produce more bromine and chlorine, which in turn hydrolyzes to hypobromous acid and/or hypobromite ion and hypochlorous acid and/or hypochlorite ion, which in turn reacts to form more bromate and chlorate ions, again releasing more bromide and chloride ions, and so on. The final electrolyzed aqueous solution contains bromate ions, and may contain hypobromous acid, hypochlorous acid, and hypobromite, bromide, chlorate, hypochlorite, and chloride ions. Again, the relative amounts of each will depend upon the reaction conditions and time.

The electrolysis is performed for a sufficient period until at least bromate is formed in the electrolyte solution. Typical reaction times range from a few minutes to about 24 hours. The actual time may be shorter or longer depending upon the volume of electrolyte, and the reaction conditions. The presence of bromate ions in the electrolyte solution may be determined by first determining the concentration of equivalent bromine (i.e. bromine, hypobromous acid, and hypobromite ion) in the electrolyte solution by titrating the solution with the reducing agent, sodium thiosulfate, using potassium iodide and starch solution as the end-point indicator. Bromate ions will not react with sodium thiosulfate. Subsequently, a sample of the same electrolyte solution is first acidified to a pH less than 1.0, so that all the bromate ions present are converted to equivalent bromine. A titration of this sample will then determine a new, higher value of active bromine species. The difference between the first and second titration values is a measure of the amount of bromate ions contained in the un-acidified electrolyte sample.

The final aqueous solution containing the active bromine compound(s) is then generated by the addition of acid to the electrolyzed solution. Suitable acids include but are not limited to sulfuric acid, hydrochloric acid, hydrobromic acid, sulfamic acid, and phosphoric acid. The pH of the acidified solution is preferably less than about 4, more preferably less than about 2, and most preferably less than about 1. The concentration of bromate ions present in the final solution will depend upon the pH of the acid used as well as the period of acidification. The lower the pH, the faster the conversion of the bromate ions to the active bromine compound(s). It is preferred that the final aqueous solution is substantially free of bromate ions. As used herein "substantially" means less than 10% bromate ions, more preferably less than 5% bromate ions, and most preferably less than 1% bromate ions.

As used herein, the active bromine compound generated includes but is not limited to bromine, hypobromous acid, hypobromite ion, hydrogen tri-bromide, and bromine chloride. Hydrogen tri-bromide is typically present when excess bromide ions are contained in the solution to be acidified. Bromine chloride may be present when the product is in the vapor phase. In aqueous solution bromine chloride hydrolyzes to hypobromous acid and hydrochloric acid.

The present invention also provides an apparatus for generating an aqueous solution containing the active bromine compound(s). A typical apparatus of the present invention is exemplified in FIG. 1. That apparatus comprises: (a) an electrogeneration system (1) for electrolyzing an aqueous electrolyte solution comprising at least one electrochemical cell (4) comprising at least one anode (5), at least one cathode (6), and an electric current means (7) for applying electric current to the electrochemical cell (4); an electrolyte reservoir (2) for holding an aqueous electrolyte solution containing bromide ions, or a mixture of bromide and chloride ions; and a transport means (3) for transporting the aqueous electrolyte solution between the electrochemical cell (4) and the electrolyte reservoir (2); (b) an acid reservoir (10) for holding an acid; (c) an acid introduction means (11) for introducing said acid from said acid reservoir (10) to said aqueous electrolyte solution; and (d) a control means (14) for controlling: (i) the transport means (3) to transport a selected volume of the electrolyte solution between the electrolyte reservoir (2) and the electrochemical cell (4) at an electric current sufficient to generate bromate ions in the aqueous electrolyte solution; and (ii) an acid introduction means (11) to introduce acid from the acid reservoir (10) to the aqueous electrolyte solution containing bromate ions to generate an aqueous solution containing the active bromine compound(s).

As used herein, the electrochemical cell (4) may be configured in an undivided arrangement without a membrane or in a divided arrangement with a membrane. Flat plate electrode cells, concentric cylinder electrode cells, and the like may be used. One electrochemical cell or a plurality of electrochemical cells may be utilized. Electrochemical cells useful for the present invention are commercially available from Electrocatalytic, Inc., Union, N.J. The number of cathode and anodes is not critical to the invention. As such, a plurality of anodes and cathodes may be used. One such anode (5) is platinized titanium. However, any anode which is capable of converting the halide to its corresponding halogen, hypohalous acid, hypohalite or halate form may be used. This includes but is not limited to other precious metal and metal oxides (e.g., $RuO_x$, $IrO_x$, $PtIrO_x$), with and without the addition of valve metal oxides (e.g. $TiO_2$, $Ta_2O_5$), and graphite. The cathode (6) is preferably titanium, although any cathode capable of evolving hydrogen over a wide pH range is acceptable for this invention, such as stainless steel.

The electric current means (7) may comprise any means for applying electric current to the electrochemical cell. For small, compact systems, a switching regulated DC power supply may be preferred. However, other types of DC power supplies may also be used such as a thyristor rectifier controlled or saturable reacter controlled power supply. Typically, the current density is set at a nominal value of 500 to 5000 $A/m^2$. However, higher or lower current densities also may be utilized.

The electrolyte reservoir (2) may be a tank or any other means for holding the electrolyte solution, and may be closed or open. It is within the confines of the present invention that the electrochemical cell (4) may be separate from the electrolyte reservoir (2) or contained within the electrolyte reservoir (2). The electrolyte solution is transported between the electrolyte reservoir (2) and the electrochemical cell (4) by the transport means (3). The transport means (3) may pass the electrolyte solution through the electrochemical cell (4) at least one time, or may be conducted in a circulating mode for a set period of time. It is preferred that the electrolyte solution is circulated between the electrolytic reservoir (2) and electrochemical cell (4). The transport means (3) may be any means for moving the electrolyte, and preferably is a pump such as a seal-less, magnetically coupled centrifugal pump. When circulation of the electrolyte is desired, the electrolyte is circulated between the electrolyte reservoir and the electrochemical cell at a circulation rate sufficient for the proper operation of the particular electrochemical cell employed. For the electrochemical cell exemplified in the present invention, the circulation rates are typically three (3) to ten (10) gallons per minute.

The reaction is preferably conducted in batch mode. However, a continuous raw material feed and product take-off arrangement is also commercially viable. When a continuous raw material feed is desired, the apparatus may further comprise an electrolyte introduction means (15) for introducing a continuous supply of the solution to be electrolyzed into the electrolyte reservoir (2). The electrolyte introduction means (15) may be a valve, pump, injection system, or any other means for introducing the solution to be electrolyzed into the electrolyte reservoir (2).

It is also within the confines of the present invention that hydrogen generated at the cathode may be de-entrained from the electrolyte in the electrolyte reservoir (2). In this regard, the electrogeneration system may further comprise a hydrogen dilution and/or dispersion means (16) for diluting and/or dispersing hydrogen generated at said cathode. The diluted hydrogen may be dispersed into the atmosphere or introduced into the water to be treated with the active bromine(s) compound solution (not shown in FIG. 1). In systems utilizing a closed top electrolyte reservoir (shown in FIG. 1), the hydrogen dilution and/or dispersion means (16) may be an eductor, blower, or the like. In such systems, the hydrogen is typically diluted to less than 25% of the lower explosive limit in air. This may be accomplished by forced ventilation using the eductor, blower, or the like. When an eductor (16) is used, the electrolyte reservoir may contain both an inlet (17) for the dilution air and an outlet (18) for the diluted hydrogen in air mixture, which is withdrawn from the electrolyte reservoir (2) by vacuum action of the eductor (16). The motive force for the eductor is preferably provided by a stream of water that is subsequently to be treated with the active bromine compound(s) generated by the electrogeneration system. When a blower (16) is used, air is blown through inlet (18), and the diluted hydrogen in air mixture is withdrawn from the electrolyte reservoir (2) via outlet (17). In systems utilizing an open top electrolyte reservoir tank (not shown in FIG. 1) the hydrogen may be diluted and dispersed by natural atmospheric process.

The acid reservoir (10) may be a tank or any other means for holding the acid. The acid introduction means (11) may be a valve, pump, injection system, or any other means for introducing acid to the aqueous electrolyte solution. The acid introduction means (11) may introduce the acid to the electrolyte solution by introducing acid directly into the electrolyte reservoir (2), or to a location (9) outside of the electrogeneration system (1). The location (9) may be a tank, tube and the like. When the acid is introduced to a location (9) outside of the electrogeneration system (1), the apparatus may further comprise an electrolyte discharge means (8) which discharges the aqueous electrolyte solution from the electrolyte reservoir (2) to the location (9) outside of the electrogeneration system (1). The electrolyte discharge means (8) may be a valve, pump, injection system, or other means for discharging the aqueous electrolyte solution from the electrolyte reservoir (2) into location (9). The acid may be introduced to the aqueous electrolyte solution before or simultaneous to the discharge of the solution. For water treatment, it is preferred to introduce the acid to the electrolyte solution at the time of dosing.

The apparatus optionally may also comprise a product discharge means (12) which discharges said aqueous solution containing the active bromine compound(s) to a location (13) outside of the apparatus. The product discharge means (12) may be a valve, pump, injection system, or other means for discharging the aqueous solution containing the active bromine compound(s) to a location (13) outside of the apparatus. The product discharge means (12) may be used for dosing the active bromine compound(s) containing solution for water treatment, and other uses.

The control means (14) is typically a programmable controller (PLC) or some other device which is capable of controlling the transport means (3) and the acid introduction means (11). It is within the confines of the present invention that the control means (14) also may control the electric current means (7) if desired. If an electrolyte introduction means (15), an electrolyte discharge means (8), a product discharge means (12) and/or a hydrogen dilution and/or dispersion means (16) are present, the control means (14) also may control their function as well. Additional components of the apparatus, which may or may not be controlled by the control means (14), would be readily apparent to one skilled in the art.

The active bromine compound(s) containing solution generated by the process and apparatus of the present invention may be used for the on-site treatment of water such as wastewater, sewage, pools and hot tubs, or in the recovery of precious metals such as gold. Other uses of the generated solution would be apparent to those skilled in the art.

For water treatment, the water to be treated may be admixed with the appropriate concentration of bromide and/or chloride ions, and introduced into the electrolyte reservoir (2) by the electrolyte introduction means (15), and subjected to the apparatus of the present invention to generate the aqueous solution containing the active bromine compound(s), which may be introduced to its place of origin via the product discharge means (12). Alternatively, the active bromine compound(s) may be generated from another water source using the process or apparatus of the present invention, and then introduced into the water being treated. For purposes of water treatment, the active bromine compound is preferably bromine and/or hypobromous acid and/or hypobromite ions.

For recovery of precious metals, the aqueous solution containing the active bromine compound(s) produced using the process or apparatus of the present invention may be introduced to the source containing the precious metal so that the precious metal is separated from its source by reaction with the active bromine compound(s). It is within the confines of the present invention that the solution depleted of active bromine compound(s) may be subjected to the process or apparatus of present invention to produce a fresh source of the active bromine compound(s) for introduction to the source containing the precious metal. For purposes of precious metal recovery, the active bromine compound is preferably bromine and/or hydrogen tribromide.

The present invention is described in the following examples which are set forth to aid in the understanding of the invention, and should not be construed to limit in any way the invention as defined in the claims which follow thereafter.

Experimental

The experimental set-up consisted of an electrolyte recycle tank with a bottom outlet feeding a seal-less, magnetically coupled centrifugal pump. The pump discharge was connected to the inlet of an electrochemical cell assembly obtained from Electrocatalytic Inc, Union, N.J., under the tradename "Chloropac" which contained two (2) anodes and two (2) cathodes. The cell was configured in an undivided arrangement, without a membrane. The anode was platinized titanium. The cathode was titanium. The electrolyte circulation rates were three (3) to ten (10) gallons per minute. The reactions were conducted in batch mode. A switching regulated DC power supply was used as the source of the electric current. Typically, the current was set at a nominal value of 40 to 50 amperes, which corresponds to an average current density of 2,150 to 2,700 A/m$^2$.

The electrolyte solutions were prepared by mixing an aqueous halide solution containing at least sodium bromide and water. Sodium chloride also was added to some of the starting solutions to increase both the electrochemical (Faraday) efficiency of the process and the electrolyte conductivity. Typical halide (sodium bromide alone, or sodium bromide and sodium chloride) concentrations ranged from 0.074 moles per liter (approximately 0.76% by weight) to over 1.11 moles per liter (approximately 11.4% by weight).

For Examples 1–4, the initial pH of the electrolyte solution was adjusted by the addition of sulfuric acid, and was maintained at a predetermined range throughout the experiment by the periodic addition of sulfuric acid. For Examples 5 and 6, the initial pH was not adjusted and was permitted to increase as a result of the electrochemistry. For Example 1, the temperature was permitted to rise as a result of the electrochemistry and the resistance heating of the circulating electrolyte. For Examples 2–6, the operating temperature was loosely controlled at a pre-established level between 15–30° C., although higher temperatures would promote the desired conversion of hypobromite to bromate under near neutral to alkaline conditions.

To reduce the concentration of the cathodically generated hydrogen in the electrolyte recycle tank to less than 1%, by volume, and prevent the build-up of potentially dangerous levels of hydrogen, the exhaust vent of the recycle tank was connected to an eductor to provide sufficient air dilution. The motive force for the eductor was a pumped stream of caustic which was also used to capture any fugitive halogen emissions from the electrolyte recirculation tank. Titration of the active halogen in the scrubber was used to quantify the loss of the halogen in the vapor exhaust. For Examples 1 and 2, the recycle steam was returned to the electrolyte tank above the surface of the liquid. For Examples 3, 4, 5 and 6, the recycle liquid was discharged below the surface of the liquid. The loss of product to the exhaust stream was uniformly higher when the recycle liquid was returned above the liquid level, and the pH<7.

EXAMPLE 1

Approximately 100 liters of an aqueous electrolyte solution was prepared containing: 0.53 mol/l NaCl and 0.15 mol/l NaBr. The flow rate of the solution was 5.5 gpm. The pH was controlled at a value of pH 3.5–6.0. The temperature was permitted to rise as a result of resistance heating over the range of 25–41° C. The run was conducted for a total of 6 hours. The average current was 45 amperes and the voltage was 10.0–10.9 volts. The liquid recycle was discharged above the liquid surface. At the end of the experiment, 40% of the product active halogen was formed in the tank, and 60% was lost and captured in the exhaust scrubber.

EXAMPLE 2

Approximately 100 liters of an aqueous electrolyte solution was prepared containing: 0.53 mol/l NaCl and 0.15 mol/l NaBr. The flow rate of the solution was 5.2–5.6 gpm. The pH was controlled at a value of pH 4.0–6.0. The temperature was controlled over the range 25–27° C. The run was conducted for a total of 7 hours. The average current was 45 amperes and the voltage was 11.1–11.4 volts. The liquid recycle was discharged above the liquid surface. At the end of the experiment, 54% of the product active halogen was formed in the tank, and 46% was lost and captured in the exhaust scrubber. Compared to the run in Example 1, this run experienced a lower loss to the exhaust chiefly as a result of the lower operating temperature.

EXAMPLE 3

Approximately 100 liters of an aqueous electrolyte solution was prepared containing: 0.52 mol/l NaCl and 0.15 mol/l NaBr. The flow rate of the solution was 7.8–8.5 gpm.

The pH was controlled at a value of pH 4.0–5.0. The temperature was controlled over the range 17–29° C. The run was conducted for a total of 7 hours. The average current was 45 amperes and the voltage was 11.3–11.8 volts. The liquid recycle was discharged below the liquid surface. At the end of the experiment, 84% of the product active halogen was formed in the tank, and 16% was lost and captured in the exhaust scrubber. Compared to the run in Example 2, this run experienced a lower loss to the exhaust chiefly as a result of discharging the recycle liquid below the surface.

EXAMPLE 4

Approximately 100 liters of an aqueous electrolyte solution was prepared containing 1.11 mol/l NaBr. The flow rate of the solution was 8.1–8.5 gpm. The pH was controlled at a value of pH 3.0. The temperature was controlled over the range 19–24° C. The run was conducted for a total of 6 hours. The average current was 45 amperes and the voltage was 7.8–8.0 volts. At the end of the experiment, 94% of the product active halogen was formed in the tank, and 6% was lost and captured in the exhaust scrubber. Compared to the run in Example 3, this run experienced a lower loss to the exhaust chiefly due to the greater product solubility in the more than seven (7) times higher initial electrolyte sodium bromide concentration. However, from an economic standpoint, there is poor utilization of the expensive sodium bromide feed. This manner of operation would be effective in a system where the sodium bromide is recovered and reused.

EXAMPLE 5

Approximately 100 liters of an aqueous electrolyte solution was prepared containing: 0.53 mol/l NaCl and 0.15 mol/l NaBr. The flow rate of the solution was 6.7–7.3 gpm. The pH was initially near neutral (pH about 7.0) and rapidly rose and stabilized at a value of pH 10.1. The temperature was controlled over the range 19–24° C. The run was conducted for a total of 6 hours. The average current was 45 amperes and the voltage was 10.1–10.7 volts. At the end of the experiment, the relative amounts of sodium bromate and sodium hypobromite were determined by titration. Approximately 42.5% of the converted bromide ion was oxidized to the bromate state and approximately 57.5% of the converted bromide ion was oxidized to the hypobromite state. The relative amounts of bromate and hypobromite are a complex function of the reaction conditions and time. The reaction product was post-acidified and the sodium bromate (sodium chlorate) and sodium hypobromite (sodium hypochlorite) were converted to the bromine (chlorine) and hypobromous (hypochlorous) acid. 100% of the product active halogen was formed in the tank. No product was lost in the exhaust scrubber.

EXAMPLE 6

Approximately 100 liters of an aqueous electrolyte solution was prepared containing: 0.60 mol/l NaCl and 0.074 mol/l NaBr. The flow rate of the solution was 8.2–8.6 gpm. The pH was initially near neutral (pH about 7.0) and rapidly rose and stabilized at a value of pH 10.1. The temperature was controlled over the range 17.5–25.0° C. The run was conducted for a total of 7 hours. The average current was 45 amperes and the voltage was 10.6–11.0 volts. The liquid recycle was discharged below the liquid surface. At the end of the experiment, the reaction product was post-acidified and the sodium bromate (sodium chlorate) and sodium hypobromite (sodium hypochlorite) were converted to the bromine (chlorine) and hypobromous (hypochlorous) acid. 100% of the product active halogen was formed in the tank. No product was lost in the exhaust scrubber. Compared to the run in Example 5, this run experienced essentially the same result despite the change in the bromide to chloride ratio.

All publications mentioned hereinabove are hereby incorporated in their entirety.

While the foregoing invention has been described in some detail for purposes of clarity and understanding, it will be appreciated by one skilled in the art from a reading of the disclosure that various changes in form and detail can be made without departing from the true scope of the invention in the appended claims.

What is claimed is:

1. A process for generating an aqueous solution containing at least one active bromine compound comprising the steps of: electrolyzing an aqueous solution containing sodium bromide and sodium chloride at an alkaline pH resulting in an increased concentration of bromate ions in the aqueous solution; and introducing to the aqueous solution containing bromate ions an acid to generate an aqueous solution containing at least one active bromine compound.

2. The process of claim 1, wherein the pH of the aqueous solution containing bromate ions is about 8–12.

3. The process of claim 1, wherein the acid is selected from the group consisting of sulfuric acid, hydrochloric acid, hydrobromic acid, sulfamic acid, and phosphoric acid.

4. The process of claim 1, wherein the acidified solution has a pH of about less than 4.

5. The process of claim 1, wherein the acidified solution has a pH of about less than 2.

6. The process of claim 1, wherein the acidified solution has a pH of about less than 1.

7. The process of claim 1, wherein the concentration of bromide and chloride ions in the solution before electrolysis is about 0.25 to 45% by weight.

8. The process of claim 1, wherein the concentration of bromide and chloride ions in the solution before electrolysis is about 0.25 to 15% by weight.

9. The process of claim 1, wherein the active bromine compound is selected from the group consisting of bromine, hypobromous acid, hypobromite ion, hydrogen tri-bromide, and bromine chloride.

* * * * *